Sept. 15, 1959 P. ROBINSON ET AL 2,904,733
MOLDED CAPACITORS
Filed Oct. 12, 1953

INVENTORS
PRESTON ROBINSON and
PAUL H. NETHERWOOD
BY
Connolly + Hutz
THEIR ATTORNEYS

United States Patent Office 2,904,733
Patented Sept. 15, 1959

2,904,733

MOLDED CAPACITORS

Preston Robinson and Paul H. Netherwood, Williamstown, Mass., assignors to Sprague Electric Company, North Adams, Mass., a corporation of Massachusetts Application October 12, 1953, Serial No. 385,317

2 Claims. (Cl. 317—258)

This invention relates to improved molded capacitors and more specifically refer to resinous seals, particularly useful for joining molded resinous casings to metal terminal leads. This application is filed as a continuation-in part of our parent application bearing the Serial No. 247,306, filed September 19, 1951, now abandoned, which is a continuation-in-part of our applications, Serial Nos. 36,897 and 36,898, both filed July 3, 1948. Application Serial No. 36,897 is now United States Patent No. 2,576,045 and Serial No. 36,898 is now abandoned and each is a continuation-in-part of our application, Serial No. 515,382, filed December 23, 1943, now United States Patent No. 2,444,880.

One form of the invention relates to end seal means for premolded outer casings for electrical capacitors, resistors, transformers, and the like, while the other form is directed to modifications of dry molded tubular capacitors.

In the past electrical capacitors, for example, have been housed in wax coated cardboard tubes in molded or cast resin casings, and in metal containers of one type or another. The wax dipped are inexpensive but the wax coating is relatively fragile and cracking or chipping of the wax coating will result in lowered humidity resistance. Further, they are not suited to high temperature operation due to limitations in the melting point of tough waxes. Accordingly, for applications in which durability, high humidity resistance and/or high temperatures are to be met, resin cased or metal cased capacitors are ordinarily employed. The resin cased units are limited in temperature range by the differential expansion of the casing and insert, and by the stability of the resin, in humidity resistance by the nature of the resin, the adherence of the resin to the terminal elements, etc. Furthermore, the molding of a resin casing around a capacitor results in deterioration of the enclosed component and variation in thickness of the wall of the molding so that objectionable thin wall cross-sections result. Still further, the high voltage molded capacitors fail upon life cycling tests inasmuch as they have been susceptible to leakage of the impregnant during heating to high temperatures, so that after cooling, voids appear within the casing leading to corona and rapid break-down of the component. Additionally, the molded units are somewhat expensive to produce in that precautionary measures must be taken to prevent crushing of the unit during molding and means must be provided for introduction of the impregnant. Another inherent difficulty with the molded units, particularly those which are preimpregnated prior to molding, is that the impregnant often mixes with the molding resin resulting in weakened segments of the molded structure. The metal cased capacitors, particularly those with glass-to-metal seals are very satisfactory over a fairly wide temperature range, but suffer from at least two disadvantages. First, the cost for the seal per se and for the assembly labor is quite high. Second, limitations in easily worked solders prevent subjection of the unit to occasional periods of very high temperatures since the solder will melt and the seal will rupture.

It is an object of the present invention to overcome the foregoing and related disadvantages. A further object is to produce new and improved molded electrical compounds, particularly paper capacitors. A still further object is to produce molded tubular capacitors of increased volume, hence higher operational voltages, which are thermally stable, present extended life to temperature cycling tests, and are relatively easy and inexpensive to produce. Additional objects will become apparent from the following description and appended claims.

These objects are attained in accordance with the present invention, wherein there is produced an electric component comprising a molded casing sealed by the use of a resin conforming to the general formula:

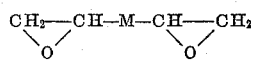

wherein M represents a bivalent organic radical containing at least three carbon atoms which is reacted with a compound conforming to the general formula:

$$Y - R - X$$

wherein Y is selected from the class of hydrogen, —COOH, —OH and —NH$_2$ groups; X is selected from the class of —COOH, —OH and —NH$_2$ groups; and R represents a bivalent organic radical.

In a more restricted sense this invention is concerned with a molded capacitor comprising a premolded case, a capacitor positioned within said premolded case, and a filled epoxy type resin sealing the open end of said premolded case, and terminal leads extending from said encased capacitor.

This invention is also concerned with the production of an electrical component comprising a molded outer casing, an encased electrical capacitor, axial leads extending from said electrical component through said outer casing, an epoxy resin sealing said leads to said casing, and a liquid dielectric impregnant contained within said molded outer casing.

In our case bearing Serial Number 36,897, we described the use of resins for making terminal seals and insulating housing in which a conventional condensation resin such as the phenolformaldehyde type is modified with another type of resin which will improve the adherence of the insulation to any metal parts which it may abut. Included in such modifying resins are the polyurethanes, the polyesters, and the polyamides. Each of these modifying agents we have now found to be of particular utility in the manufacture of insulation in which the base resin is an epoxy type.

In our parent case bearing Serial Number 36,898 we disclose the process for making extremely durable terminal seals for capacitors and other devices wherein a resin such as a phenolformaldehyde resin with a selected filler in an appropriate concentration is cast or molded to provide a terminal seal.

In our additional parent case bearing Serial Number 247,306, we have found an improvement upon such invention by the use of a specific class of fillers, by the use of which it is unnecessary to shrink the resin about the metal. Thus, bonds can be made between plane surfaces. The basic resins used in accordance with this invention comprise those having in the intermediate stage at least one and preferably two or more epoxy groups per molecule. These intermediates are readily produced usually through condensation of epichlorohydrin with compounds such as bisphenol and diphenylolpropane. The general formula is the following:

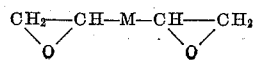

M can be bivalent organic radical such as a straight or branched chain radical or in the case of bisphenol condensation products may be a radical containing two phenyl nuclei joined to each other by an aliphatic hydrocarbon group and to the epoxy groups through an ether linkage.

The conversion of these intermediates into the desired form can be accomplished through use of carboxylic acids, alcohols and/or amines. Typical acids are adipic acid and stearic acid, poly basic acids being preferred. Long chain acids such as stearic acid improve the water repellency. Typical alcohols are octyl alcohol, ethylene glycol, and glycerine. Suitable amines include dodecyl amine, beta naphthylamine, diethylene triamine, phenylene diamine, etc. The percentage of these compounds used to effect the appropriate condensation may be varied from theoretical down to amounts just sufficient to cross-link or react enough epoxy molecules to obtain the desired resin form.

For this purpose it is understood that reactive polyesters, polyamides, and polyurethanes, can be used in whole or to supplement the action of the cross-linking agent. It is, of course, necessary that these latter resins possess appropriate reactive groups.

In accordance with one of the preferred embodiments of our invention we treat the condensed resin with an organic isocyanate. This is normally done after the condensation has occurred. For a massive treatment we employ a thermally unstable reacted isocyanate (such as methyl alcohol with hexamethylene diisocyanate) which will give the active isocyanate upon heating to elevated temperatures. According to a limited embodiment we treat the surface of condensed resin seals with an organic isocyanate, reacting any exposed hydroxy groups to further improve the water repellency.

Suitable isocyanates includes phenyl isocyanate, hexamethylene diisocyanate and meta tolylene diisocyanate.

Another type of resin exhibiting excellent metal-to-nonmetal bonding characteristics is the linear aromatic polyphosphates exemplified by the reaction of the product of phenol and phosphorous oxy chloride with a dihydroxy phenol to yield a resin having the recurring structure.

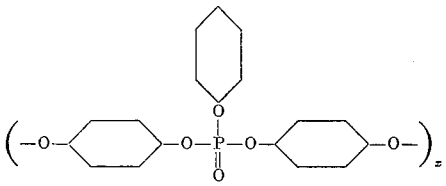

The fillers are inert materials, usually ground to particle size less than about 35 mesh. The preferred range of particle size is from about 100 mesh to about 325 mesh. Optimum results are obtained when substantial quantities of different mesh ranges are present, as for example, 50% between 100 and 150 mesh, 25% between 150 and 200 mesh and 25% between 200 and 325 mesh. The range of filler concentration is usually from about 10 to about 80 parts by weight, based on the total weight of seal.

Organic fillers may be employed. These include polytetrafluoroethylene, polytrifluoromonochloroethylene, cotton, rayon, silicone polymers, polyacrylonitrile, vulcanized natural and synthetic rubbers, styrene-divinylbenzene thermoset copolymers, polydiallylphthalate, polyallyl carbonates, etc. It is essential that the softening point of such fillers, per se, should they be thermoplastic in nature, is above the maximum temperature to which the resin seal will be subjected.

Inorganic fillers also may be used with success. Included in this group are mica, expanded mica and vermiculite, steatite, talc, zinc oxide, china clay, bentonite, whiting, etc. Where a high dielectric constant mass is desired, high dielectric constant fillers, such as titanium dioxide, the titanates of barium and strontium, selected zirconates, etc. may be employed.

The preferred fillers of the invention are the low, zero and negative temperature coefficient ceramics, such as aluminum titanate, lithia alumina silicate, etc. Through use of these fillers of selected properties and in selected concentration, it is possible to obtain resin seals of unusual and perfectly matched-to-metal thermal characteristics, as well as other types of material seals.

The metal elements to which seals can be made are numerous. Common metals and alloys, such as copper, brass, zinc, tin, bronze, iron, aluminum, may be used as well as the less commonly used materials such as nickel, cadmium, lead, tantalum, magnesium, etc.

In our invention we have found that it is possible to produce molded components having unique and desirable properties, which properties overcome many of the objections set forth as difficulties in the prior art. We have also found that it is possible to produce a dry molded paper capacitor by impregnating this capacitor through defined openings adjacent to the place where the terminal wire extends through the molded casing, after which it is possible to seal the component by means of a filled or unfilled epoxy type resin. Furthermore, we have found that by preparing a premolded casing for the electrical component prior to introduction of the component within the casing, it is possible to obtain a uniform casing of much improved electrical characteristics and much larger size than was heretofore possible after which the component itself was inserted into the molded casing and sealed by means of the filled or unfilled resin described in the parent case Serial No. 247,306.

To better understand the present invention, reference may be made to appended drawings in which.

Figure 1:
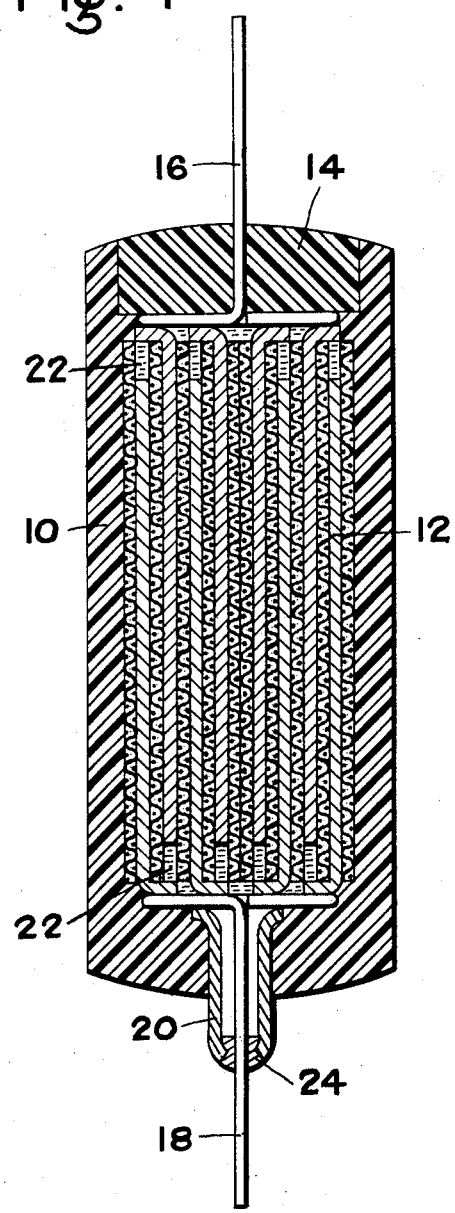
Figure 1 shows a cross-section of a sealed premolded tubular capacitor.

Referring more specifically to Figure 1, 10 represents the premolded casing enclosing a rolled capacitor section 12 which is sealed by a filled resin 14 of the epoxy type and terminal leads 16 and 18 extending from the casing. 20 indicates an eyelet for impregnation of the capacitor section by the impregnant 22 which is sealed within the casing after impregnation by means of solder 24 covering the eyelet 20.

Figure 2:
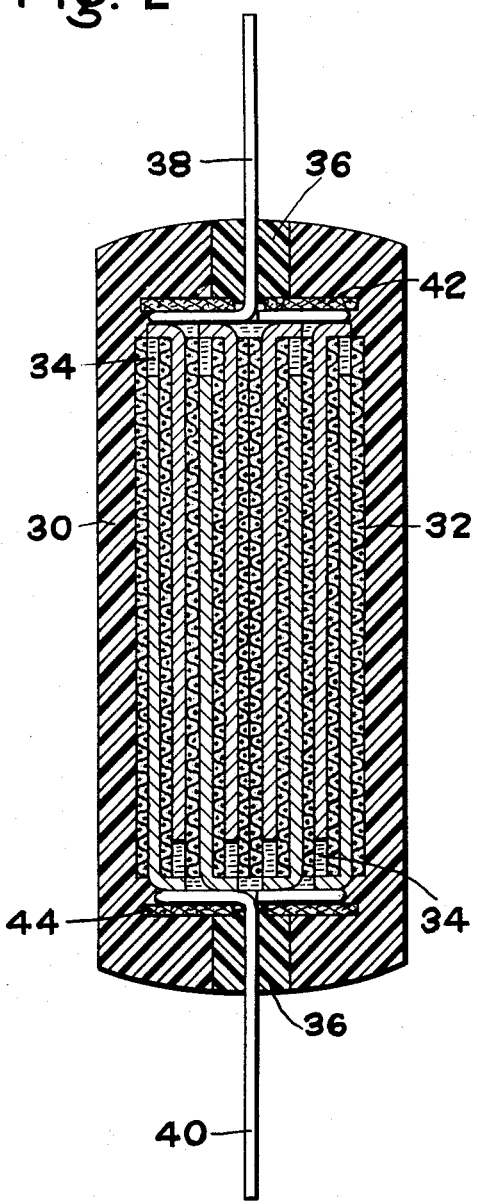
Figure 2 shows a simplified cross-section of a molded resin sealed impregnated capacitor.

Figure 2 shows a simplified cross-section of a dry molded paper section wherein 30 represents a molded casing enclosing the capacitor 32, which is impregnated by the impregnant 34, which impregnant is confined within the molded casing by means of the filled or unfilled epoxy type resin seals 36 bonding the molded casing to the terminal wires 38 and 40. Within the assembly are fibrous spacers 42 and 44 which prevent the resinous material which seals the component from extending into the capacitor section while allowing the impregnating of the capacitor within the confined volume defined by the molded casing. This fibrous spacer application is unnecessary; however, it might well be utilized as a preferred structure to facilitate rapid production of the components.

For the preformed casing our invention makes possible the use of mineral filled phenolic thermosetting resins rather than the wood flour which has been necessitated by previous molding practices so as to prevent crushing of the component. Thus with the preformed section it is possible to achieve much higher pressures during molding of the casing, and these preformed sections are of uniform thickness and of a size hitherto unobtainable. Suitable fillers for incorporation within the molding compound were expanded mica, vermiculite, steatite, talc, zinc oxide, china clay, bentonite, whiting, and so forth. The previously utilized wood flour is deficient in electrical resistance characteristics for high voltage applications and ability to withstand moisture penetration.

For both of the disclosed embodiments it is possible to use any of the well-known dielectric impregnants, including mineral oil, unsaturated hydrocarbons, chlorinated aromatic compounds, polyesters, n-vinyl carbazole, and so forth.

As an example of the invention, preformed molded casings having a size of 1" in diameter by 2⅜" long were formed of a mineral filled phenolformaldehyde resin. The preformed casings were formed under a pressure of approximately 2,500 pounds per square inch within a temperature range of 300° C. to 350° C. which has been found to be suitable for the curing of these preformed casings. Capacitor sections of ¼ mil aluminum foil wound with three layers of ¼ mil paper having a capacitance of 2 mfds. were placed in the preformed casing and impregnated with an impregnant consisting of polyisobutylene having an average molecular weight between 1,000 and 5,000 and finally thereafter sealed with a mineral filled epoxy resin. Comparative units were formed with a wood flour phenolic case and impregnated with the same dielectric material. The six units of the wood flour filled phenolic case lasted 5,000 hours before failure, while a group of mineral filled phenolic encased units show no failures for over 9000 hours with the leakage resistance in excess of 100,000 megohms after that time.

As a further example of our invention, a rolled non-inductive capacitor section having soldered terminal wires attached was placed in a compression molding device with preformed half shells of a phenolformaldehyde resin. The unimpregnated units were dry molded to join the shells with metal tubes placed over the terminal wires so that after molding the tubes could be removed and means would remain to impregnate the molded units. A paper spacer was placed adjacent to one soldered terminal so as to provide means for maintaining the sealing resin from extending into the capacitor section. After molding the metal tubes were removed and impregnation with mineral oil was obtained by submerging the units in the impregnation vat containing the dielectric for 2 hours at a pressure of less than 500 microns of mercury followed by 2 hours under nitrogen. After impregnation the units were dried and the sealing resin was placed in each of the axial openings about the terminal wires followed by curing of the epoxy resin for 2 hours at room temperature followed by 16 hours at 70° C. These units thus were impregnated without eyelets which have previously been utilized in this type of construction.

A still further example of the present invention utilizes a metallized paper capacitor section with terminal leads extending from one end. When surrounded by a molded casing as described above, both leads project from one end of the casing and this end is sealed with an epoxy resin bonded to the casing and to the lead.

As many apparently widely different embodiments of this invention may be made without departing from the spirit and scope hereof, it is to be understood that the invention is not limited to the specific embodiments hereof except as defined in the appended claims.

What is claimed is:

1. A capacitor comprising a premolded mineral-filled phenol formaldehyde resin casing having an open end, a convolutely wound capacitance section of electrodes and interleaved dielectric layers, said section having lead-wires attached to said electrodes and extending therefrom, said section fitted snugly within said casing with at least one of said lead-wires extending beyond said open end, an epoxy resin cured against and sealing said open end and bonding to said extending lead-wire, said epoxy resin reacted with an organic isocyanate.

2. The capacitor of claim 1 wherein said section is a metallized capacitance section, and said electrodes are deposited on said dielectric layers.

References Cited in the file of this patent

UNITED STATES PATENTS

| 2,526,688 | Robinson | Oct. 24, 1950 |
| 2,594,979 | Nelson | Apr. 29, 1952 |
| 2,596,134 | Dorst | May 13, 1952 |
| 2,628,271 | Brafman | Feb. 10, 1953 |
| 2,674,646 | Schoch | Apr. 6, 1954 |
| 2,682,626 | Robinson | June 29, 1954 |
| 2,713,700 | Fisher | July 26, 1955 |

FOREIGN PATENTS

| 562,413 | Great Britain | June 30, 1944 |
| 569,202 | Great Britain | May 11, 1945 |

OTHER REFERENCES

Publication I, "Ethoxylines," by Preiswerk and Meyerhans in Electrical Manufacturing, pp. 78–81, 164 and 166, July 1949.

"Electrical Manufacturing," September 1952, page 138.